June 26, 1934.  B. M. HYMAN  1,964,579
GATHERING DEVICE FOR CORN PICKERS
Filed Nov. 17, 1933  2 Sheets-Sheet 1
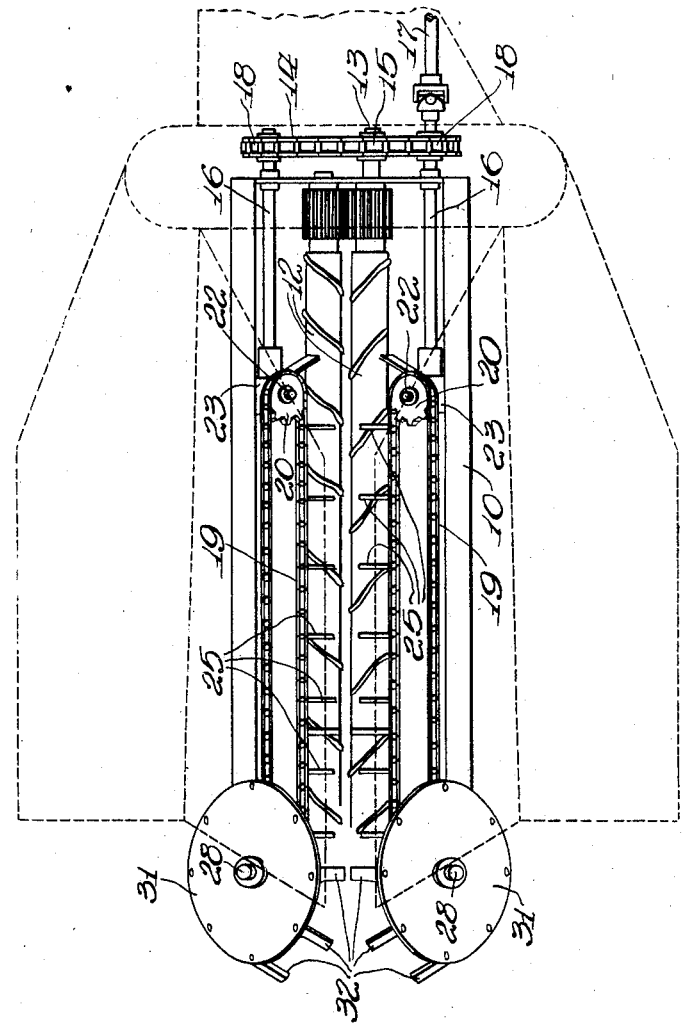
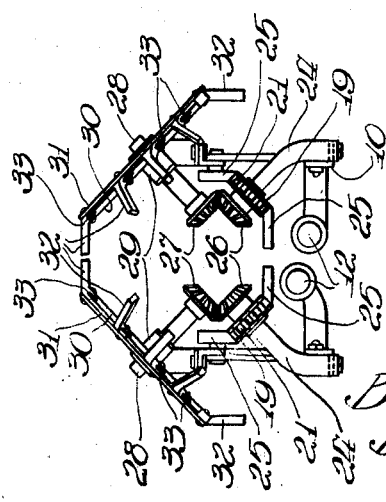
Inventor
Benjamin M. Hyman June 26, 1934.  B. M. HYMAN  1,964,579
GATHERING DEVICE FOR CORN PICKERS
Filed Nov. 17, 1933  2 Sheets-Sheet 2
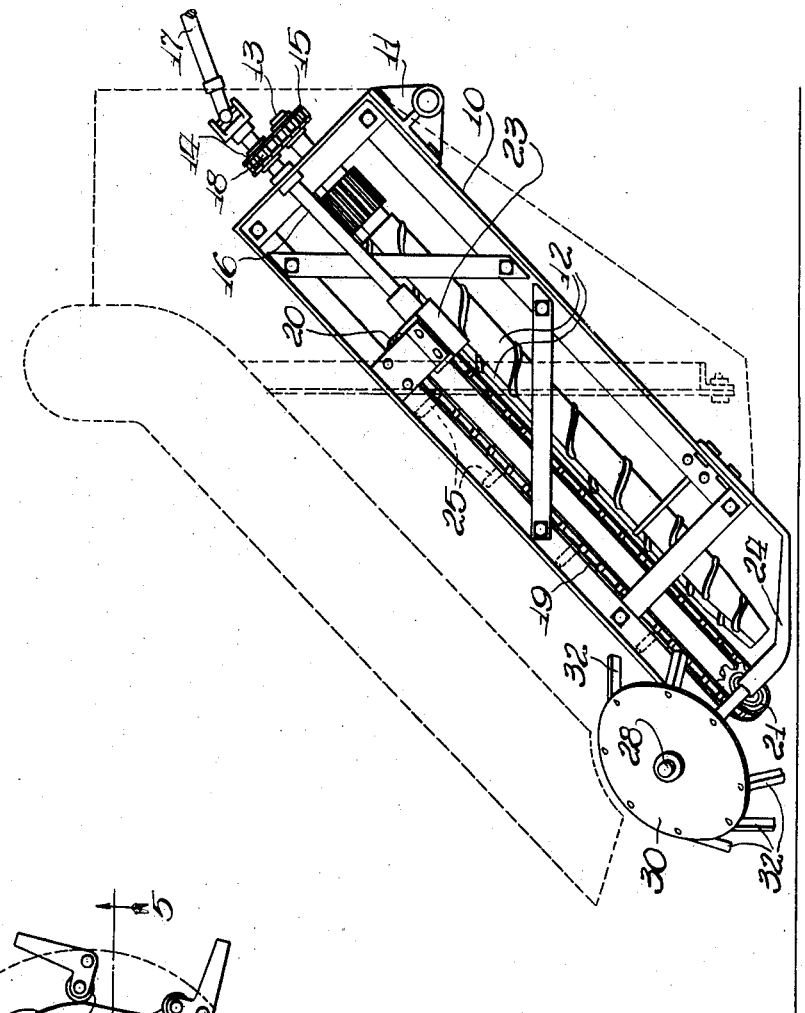
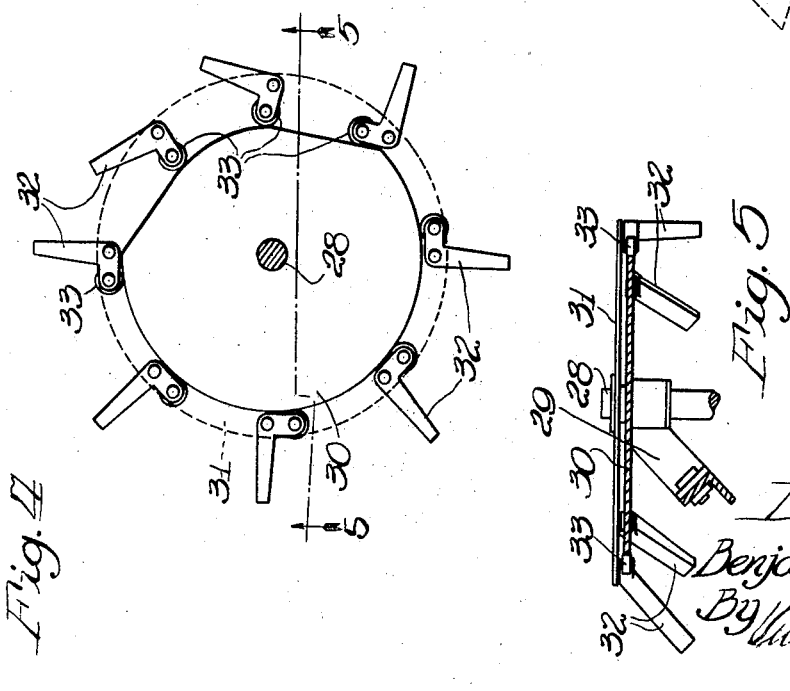
Inventor
Benjamin M. Hyman
By Victor J. Evans
Atty.

Patented June 26, 1934

1,964,579

UNITED STATES PATENT OFFICE 1,964,579

GATHERING DEVICE FOR CORN PICKERS

Benjamin M. Hyman, Moline, Ill., assignor to International Harvester Company, a corporation of New Jersey Application November 17, 1933, Serial No. 698,418

12 Claims. (Cl. 56—119)

This invention relates to corn pickers. More specifically, it relates to an improvement in gathering means for collecting the stalks and delivering them to the snapping rolls of a corn picker.

In the operation of corn pickers having downwardly and forwardly extending snapping rolls, gathering means are provided for collecting the bent-over stalks and delivering them to the snapping rolls. Under some conditions of operation the stalks are broken and bent over to the extent that difficulty is encountered in properly delivering the stalks to the snapping rolls.

The principal object of the present invention is to devise an improved stalk gathering means for corn pickers. More specifically the object is to provide, in combination with gathering chains of a somewhat conventional construction, additional gathering means operative to function with the gathering chains to hold the stalks in a substantially vertical position as they are delivered to the snapping rolls. These objects and others which will be apparent are accomplished by a construction such as shown in the accompanying drawings, in which:

Figure 1 is a plan view, showing a snapping roll supporting structure with a gathering device with the present invention incorporated therewith;

Figure 2 is a front elevation of the structure shown in Figure 1;

Figure 3 is a side elevation of the structure shown in Figure 1;

Figure 4 is an enlarged detail view, showing a cam arrangement for operating the gathering fingers of the auxiliary gathering members; and, Figure 5 is a section taken on the line 5—5 of Figure 4.

Corn pickers of the type having a frame structure extending forwardly and downwardly with spaced portions to provide means for mounting snapping rolls are well known in the prior art. The United States Patent No. 1,925,077 shows a tractor mounted picker of a type to which the present invention may be applied. It will be noted in Figures 1 and 3 that the shields over the gathering means and the arch over the snapping means have been indicated in dotted lines to better show the relative position of the structure disclosed in a complete corn picker as shown in the patent above referred to.

The angle iron frame structure 10 consists of two transversely spaced sections mounted at their upper ends on a carrying bracket 11. Snapping rolls 12 are mounted on the frame structure for rotation about their axes. The rolls are geared together at their upper ends and driven by a shaft 13 extending rearwardly from one of the rolls. A drive chain 14 engages a sprocket 15 mounted on said shaft. At each side of the snapping rolls a drive shaft 16 is rotatably mounted for driving the gathering means at the respective sides of the snapping rolls. One shaft 16 is extended rearwardly and connected by a universal joint to a drive shaft 17, which may be connected to the power take-off of a tractor or to any other source of power. A chain 14 engages sprockets 18 on the shafts 16.

A gathering chain 19 is mounted on a sprocket 20 near the top of the snapping rolls and on a sprocket 21 beyond the lower end of the snapping rolls. A similar chain is mounted at each side of the snapping rolls. At the upper end the sprockets 20 are mounted on shafts 22 extending from gear boxes 23 containing gearing for driving the shafts 22 from the shafts 16.

At the lower end the sprockets 21 are rotatably mounted on extensions 24 from the lower end of the frame sections 10. It will be noted that the extensions 24 are bent over at an angle of substantially 45 degrees with respect to horizontal. The shafts 22 are also positioned at an angle substantially parallel to the extensions 24. The axes of the chain sprockets intersect above the chains at substantially a right angle.

Lugs, or gathering fingers, 25, spaced at regular intervals on the chains 19, are positioned at an angle of substantially 45 degrees with respect to the planes between which the chains operate. These fingers are so angled that, at the lower run of the chain adjacent the snapping rolls, the lugs 25 lie substantially horizontal. In this position the fingers are most effective to carry the stalks of corn into the machine.

Each of the chain sprockets 21 carries integrally therewith a bevel gear 26. This gear engages a bevel gear 27 mounted on a shaft 28. It will be noted by this construction that the shaft 28 is substantially at right angles with respect to the extension 24 and is at a substantially 45 degree angle with respect to horizontal. A bearing 29, secured to a portion of the frame structure 10, for the shaft 28 carries rigidly therewith a cam plate 30. Above the cam plate a rotary gathering member 31 is mounted for rotation on the shaft 28. A plurality of gathering fingers 32 are pivotally mounted around the periphery of each gathering member 31. These fingers are provided with short arms which carry rollers 33 positioned to operate along the edge of the cam plate 30. As shown in both Figures 1 and 4, the cam is so arranged that the fingers fold in towards the periphery of the gathering member as the fingers pass out of the position in which they advance the stalks along the snapping rolls. This feature is provided to prevent the carrying around of stalks, which is sometimes brought about by rigid arms or fingers on a rotating member of this type. The pivoted fingers 32 are arranged at an angle of substantially 45 degrees with respect to the disk member 30 in the direction of the snapping rolls. By this construction, the fingers are substantially horizontal when in the uppermost position, as shown in Figure 2. By this construction the stalks are lifted and then carried into the machine in a substantially vertical position, the fingers 25 on the lower gathering chains and the fingers 32 on the gathering members co-operating to carry the stalk along substantially vertical.

It has been found that the construction as above described functions effectively to pick up stalks and carry them into the throat of a corn picker.

It is to be understood that applicant claims as his invention all modifications falling within the scope of the appended claims.

What is claimed is:

1. In a corn picker and in combination, a frame structure, downwardly inclined snapping rolls mounted on said frame structure, a pair of gathering chains mounted above said snapping rolls, a pair of rotary gathering members mounted above the gathering chains, said members being mounted for rotation upon axes forming an angle with respect to each other, and gathering lugs carried by said members.

2. In a corn picker and in combination, a frame structure, downwardly inclined snapping rolls mounted on said frame structure, a pair of gathering chains mounted above said snapping rolls, a pair of rotary gathering elements mounted above the gathering chains, said elements being mounted for rotation upon axes forming substantially a right angle with respect to each other, and gathering lugs carried by said elements positioned at angles with respect to the axes to bring said lugs into horizontal position over the snapping rolls.

3. In a corn picker and in combination, a frame structure, downwardly inclined snapping rolls mounted on said frame structure, a pair of gathering chains mounted above said snapping rolls, a pair of rotary gathering elements mounted above the gathering chains, said elements being mounted for rotation upon axes forming an angle with respect to each other with the upper edges of the members lying adjacent each other over the snapping rolls, and gathering lugs carried by said elements.

4. In a corn picker and in combination, a frame structure, downwardly inclined snapping rolls mounted on said frame structure, a pair of gathering chains mounted above said snapping rolls, a pair of rotary gathering members mounted above the gathering chains, said members being mounted for rotation upon axes forming substantially a right angle with respect to each other, and gathering lugs carried by said elements.

5. In a corn picker and in combination, a frame structure, downwardly inclined snapping rolls mounted on said frame structure, a pair of gathering chains mounted above said snapping rolls, a pair of rotary gathering members mounted above the gathering chains, said members being mounted for rotation upon axes forming substantially a right angle with respect to each other with the upper edges of the members adjacent each other, and gathering lugs carried by said elements positioned at angles with respect to the axes to bring said lugs into horizontal position over the snapping rolls at the upper adjacent edges.

6. In a corn picker and in combination, a frame structure, downwardly inclined snapping rolls mounted on said frame structure, a pair of gathering chains mounted above said snapping rolls, a pair of rotary gathering elements mounted above the gathering chains, said elements being mounted for rotation upon axes forming substantially a right angle with respect to each other, a stationary cam mounted on the frame structure adjacent each rotary gathering element, and gathering lugs pivotally carried by said gathering elements positioned to be operated by said cams to permit folding of the lugs during a portion of the rotary movement of the elements and to project the lugs during the remainder of the movement.

7. In a corn picker and in combination, a frame structure, downwardly inclined snapping rolls mounted on said frame structure, a pair of gathering chains mounted above said snapping rolls, a pair of rotary gathering members mounted above the gathering chains on the frame structure, said members being positioned at an angle with respect to each other, gathering lugs pivotally mounted on said members and projecting therefrom at an angle with respect to the gathering member, said angle being such as to bring the lugs into substantially horizontal position over the snapping rolls, and a stationary cam mounted on the frame structure adjacent each gathering element positioned and formed to engage the pivoted gathering lugs to project said lugs during movement over the snapping rolls and to permit the folding of said lugs during a portion of the rotary movement of the gathering elements.

8. In a corn picker, a frame structure, a pair of downwardly inclined snapping rolls mounted on said frame structure, a gathering chain mounted alongside and above each snapping roll, gathering lugs mounted on said chains, rotary gathering elements positioned forwardly of the lower end of the snapping rolls, and gathering lugs mounted on said elements and positioned to lie substantially horizontally when in position above the snapping rolls.

9. In a corn picker, a frame structure, a pair of downwardly inclined snapping rolls mounted on said frame structure, a gathering chain mounted alongside and above each snapping roll, said chains being mounted for movement between planes angled to intersect below the chains, gathering lugs mounted on said chains at such an angle with respect thereto that they lie in a substantially horizontal plane on the portions of the chains nearest the snapping rolls, rotary gathering elements mounted for rotation on the frame structure, and gathering lugs mounted on said elements.

10. In a corn picker, a frame structure, a pair of downwardly inclined snapping rolls mounted on said frame structure, a gathering chain mounted alongside and above each snapping roll, said chains being mounted for movement between planes at an angle with respect to horizontal, gathering lugs mounted on said chains at such an angle with respect thereto that they lie in a substantially horizontal plane along the adjacent portions of the chain, rotary gathering elements mounted for rotation on axes parallel to the planes of the gathering chains, and gathering lugs mounted on said elements at such an angle with respect to the axis thereof that the lugs are substantially horizontal when in position above the snapping rolls.

11. In a corn picker, a frame structure, a pair of downwardly inclined snapping rolls mounted on said frame structure, a gathering chain mounted alongside and above each snapping roll, said chains being mounted for movement between planes at an angle with respect to horizontal, gathering lugs mounted on said chains at such an angle with respect thereto that they lie in a substantially horizontal plane, rotary gathering elements mounted for rotation on axes parallel to the planes of the gathering chains with their upper edges lying closely adjacent each other directly above the snapping rolls, and gathering lugs mounted on said elements at such an angle with respect to the axis thereof that the lugs are substantially horizontal when in position above the snapping rolls.

12. In a corn picker, a frame structure, a pair of downwardly inclined snapping rolls mounted on said frame structure, a gathering chain mounted alongside and above each snapping roll, said chains being mounted for movement between planes angled to intersect below the chains, gathering lugs mounted on said chains at such an angle with respect thereto that they lie in a substantially horizontal plane on the portion of the chains nearest the snapping rolls, rotary gathering elements mounted for rotation on the frame structure, and gathering lugs mounted on said elements and positioned to lie in a substantially horizontal plane over the snapping rolls.

BENJAMIN M. HYMAN.